C. J. THIM.
RUNNER ATTACHMENT FOR WHEELS.
APPLICATION FILED APR. 13, 1910.

983,324.

Patented Feb. 7, 1911.

Witnesses

Carl J. Thim
Inventor,
by C. A. Snow & Co.
Attorneys

UNITED STATES PATENT OFFICE.

CARL J. THIM, OF LOGAN, UTAH.

RUNNER ATTACHMENT FOR WHEELS.

983,324.   Specification of Letters Patent.   Patented Feb. 7, 1911.

Application filed April 13, 1910. Serial No. 555,245.

*To all whom it may concern:*

Be it known that I, CARL J. THIM, a subject of the King of Sweden, residing at Logan, in the county of Cache and State of Utah, have invented a new and useful Runner Attachment for Wheels, of which the following is a specification.

This invention relates to runners adapted to be attached to the wheels of baby carriages and the like, one of the objects of the invention being to provide a runner which is light and durable in construction, can be readily applied to a wheel, and which, when not in use, can be stored within a small space.

With these and other objects in view the invention consists of certain novel details of construction and combinations of parts hereinafter more fully described and pointed out in the claim.

In the accompanying drawings the preferred forms of the invention have been shown.

Figure 1:
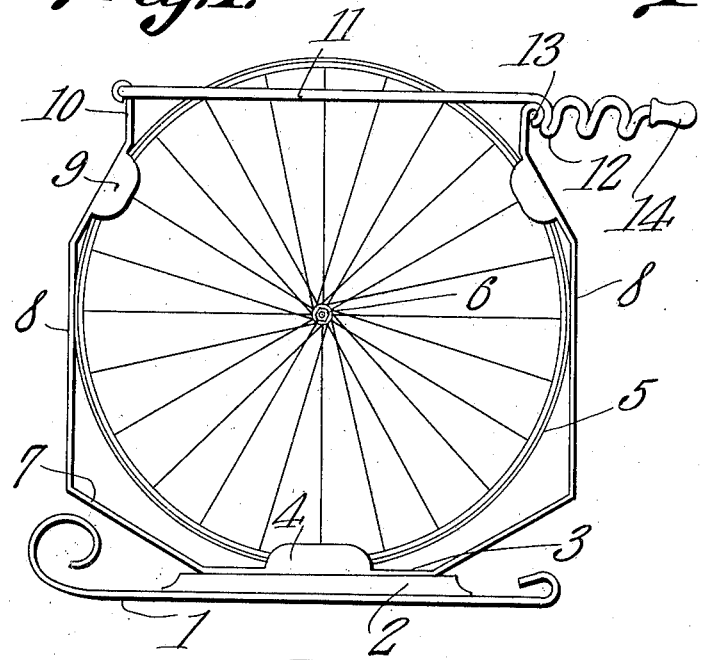
Figure 2:
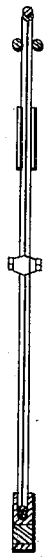
Figure 3:
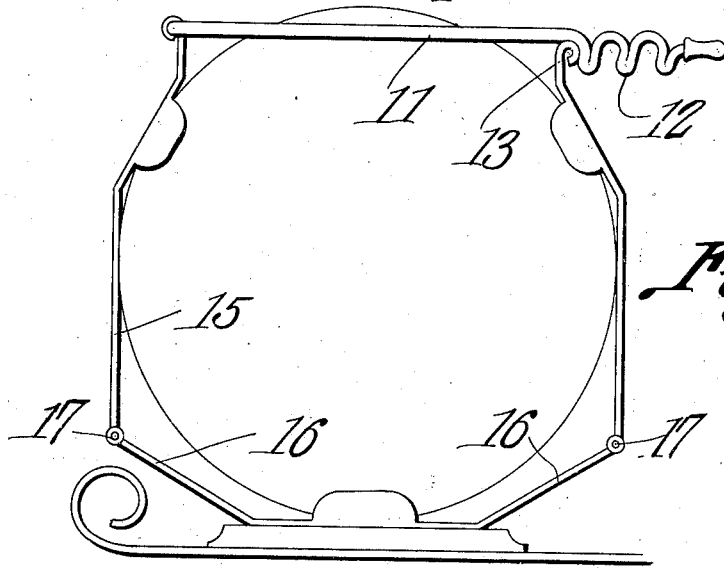

In said drawings:—Figure 1 is a side elevation of the attachment, the same being shown in position upon a wheel. Fig. 2 is a central vertical transverse section through the parts shown in Fig. 1. Fig. 3 is a side elevation of a modified form of attachment.

Referring to the figures by characters of reference 1 designates a runner of any desired shape and size, the same being provided upon its intermediate portion with a base block 2 on which is secured the intermediate portion 3 of a metal strip. This intermediate portion has spaced upstanding ears 4 the distance between these ears being such as to permit the rim 5 of a wheel 6 to be readily inserted therebetween. Upwardly inclined extensions 7 extend from the ends of the intermediate portion 3 of the strip and these extensions merge into spring arms 8 each of which is preferably angular as shown and has spaced ears 9 for the reception of the wheel rim therebetween. The terminal portion 10 of one of the arms 8 has an elongated loop 11 pivotally connected to it, the free end portion of this loop being bent so as to form a plurality of teeth or projections 12, any one of which is adapted to engage the terminal portion 13 of the other arm 8. A handle 14 may be formed upon the free end of the loop 11 so as to facilitate the manipulation thereof.

When it is desired to place the attachment upon a wheel, the loop 11 is disengaged from the terminal 13 and swung out of the way so as to permit the wheel 6 to be placed between the ears 4 and between the ears 9. As the metal strip 3, its extension 7 and arms 8 are all formed of spring metal, it will be apparent that the said strip will adjust itself to wheels of different diameters. After the wheel has thus been placed within the attachment, the loop 11 can be swung into engagement with the terminal 13, opposite portions of the loop extending along opposite sides of the wheel and any one of the teeth or projections 12 being placed in engagement with the terminal 13 so as to cause the two arms 8 to bind firmly upon the wheel rim. After the attachment has thus been placed upon and secured to the wheel, it will be apparent that the vehicle supported by the wheel can be pushed along in the same manner as a sled.

In order that the attachment, when not in use, may be stored within a small space, the arms 15 may be hingedly connected to the extension 16 as shown at 17 in Fig. 3. It will be apparent therefore that after the attachment has been removed from a wheel, the arms 15 can be folded downwardly onto the extensions 16 and the entire device can thus be conveniently stored, it even being possible to place it within the baby carriage or other vehicle with which the runner is to be used. It is of course to be understood that one of these attachments is to be used in connection with each wheel of the vehicle.

Various changes can of course be made in the construction and arrangement of the parts without departing from the spirit or sacrificing any of the advantages of the invention as defined in the appended claim.

What is claimed is:—

An attachment for vehicle wheels including a runner, upstanding resilient arms upon the runner, means upon the arms and runner for holding a wheel against lateral displacement relative thereto, an elongated wheel receiving loop pivotally connected to one of the arms, separate means upon the loop for engaging the other arm to hold the two arms in predetermined relation, and an operating handle upon the loop.

In testimony that I claim the foregoing as my own, I have hereto affixed my signature in the presence of two witnesses.

CARL J. THIM.

Witnesses:
ARTHUR JENSEN,
A. A. LAW.